United States Patent
Miyakawa et al.

(10) Patent No.: US 8,479,451 B2
(45) Date of Patent: Jul. 9, 2013

(54) EXTRUSION MOLDED PRODUCT HAVING A CORE MATERIAL

(75) Inventors: Naohisa Miyakawa, Shiroi (JP); Katsuhisa Kato, Inzai (JP)

(73) Assignees: Tokiwa Chemical Industries, Co., Ltd., Chiba (JP); System Technical Co., Ltd., Chiba (JP)

( * ) Notice: Subject to any disclaimer, the term of this patent is extended or adjusted under 35 U.S.C. 154(b) by 0 days.

(21) Appl. No.: 12/984,829

(22) Filed: Jan. 5, 2011

(65) Prior Publication Data

US 2011/0219699 A1 Sep. 15, 2011

(30) Foreign Application Priority Data

Mar. 15, 2010 (JP) ................................. 2010-085521

(51) Int. Cl.
*E06B 7/16* (2006.01)

(52) U.S. Cl.
USPC ........................................................ 49/490.1

(58) Field of Classification Search
USPC ..... 49/490.1, 440, 441, 475.1; 277/647; 428/112
See application file for complete search history.

(56) References Cited

U.S. PATENT DOCUMENTS

| | | | | |
|---|---|---|---|---|
| 5,007,202 A | * | 4/1991 | Guillon | 49/441 |
| 5,016,394 A | * | 5/1991 | Iida et al. | 49/441 |
| 5,027,556 A | * | 7/1991 | Ginster | 49/441 |
| 5,054,241 A | * | 10/1991 | Mishima et al. | 49/490.1 |
| 5,177,147 A | * | 1/1993 | Spenadel et al. | 525/88 |
| 5,183,613 A | * | 2/1993 | Edwards | 264/173.19 |
| 5,319,029 A | * | 6/1994 | Martin et al. | 525/240 |
| 5,622,008 A | * | 4/1997 | King | 49/498.1 |
| 5,623,008 A | * | 4/1997 | Fujiwara et al. | 524/114 |
| 5,693,727 A | * | 12/1997 | Goode et al. | 526/86 |
| 6,185,869 B1 | * | 2/2001 | Kawai | 49/441 |
| 6,245,856 B1 | * | 6/2001 | Kaufman et al. | 525/240 |
| 6,316,068 B1 | * | 11/2001 | Masubuchi et al. | 428/35.7 |
| 6,493,992 B2 | * | 12/2002 | Goto | 49/441 |
| 6,623,014 B1 | * | 9/2003 | Martin | 277/630 |
| 6,642,316 B1 | * | 11/2003 | Datta et al. | 525/240 |
| 7,237,359 B2 | * | 7/2007 | Aritake et al. | 49/441 |
| 7,811,653 B2 | * | 10/2010 | Miyakawa et al. | 428/122 |
| 8,033,057 B2 | * | 10/2011 | Krause et al. | 49/441 |
| 2003/0017223 A1 | * | 1/2003 | Tasaka et al. | 425/88 |
| 2005/0022454 A1 | * | 2/2005 | Aida et al. | 49/490.1 |
| 2007/0173591 A1 | * | 7/2007 | Kanae et al. | 524/502 |

FOREIGN PATENT DOCUMENTS

GB 2209788 * 5/1989
JP 58161639 A * 9/1983

* cited by examiner

*Primary Examiner* — Jerry Redman
(74) *Attorney, Agent, or Firm* — Wenderoth, Lind & Ponack, L.L.P.

(57) ABSTRACT

An extrusion molded product having a core material for mounting thereof on a flange around the periphery of an opening of an automobile body, such as a door, a trunk, a back door, and a slide door includes a pressure receiving member including a soft thermoplastic elastomer composition connected to opposed side portions of a core material having a generally U-shaped cross section in the longitudinal direction, a hollow chamber formed in the upper portion of the core material by connecting the pressure receiving member to the opposed side portions of the core material, and a sealing portion having a thickness thinner than a thickness of the pressure receiving member formed in a part of the pressure receiving member.

8 Claims, 6 Drawing Sheets

US 8,479,451 B2

EXTRUSION MOLDED PRODUCT HAVING A CORE MATERIAL

BACKGROUND OF THE INVENTION

1. Field of the Invention

The present invention relates to an extrusion molded product having a core material, such as a weather strip and a trim, for mounting thereof on a flange around the periphery of an opening of an automobile, such as a door, a trunk, a back door, and a slide door.

2. Description of the Related Art

This type of extrusion molded product having a core material, such as a weather strip and a trim, for mounting thereof on a flange around the periphery of an opening of an automobile body, such as a door, a trunk, a back door, and a slide door is conventionally known from the Japanese Patent Application Publication No. 1998-1002, and the conventionally known extrusion molded product comprises a core material (3) having a generally U-shaped cross section in the longitudinal direction and a coating layer (8) formed integrally in the outside of said core material (3) and having a hollow seal portion (2), and is provided with a pressure receiving member (4) comprising an uniform thickness and having a hollow chamber (5) formed in the inside of said core material (3), as shown in FIG. 11, in order to prevent an inflow of water and a production of noise in the running of automobile, and to increase an air and water tightness. However, the pressure receiving member (4) is elongated throughout and a gap (17) is produced between the pressure receiving member (4) and a flange side portion (16), because a thickness of the pressure receiving member (4) is uniform, when said extrusion molded product (1) is mounted on a flange edge (15) by contacting elastically thereof with said flange edge (15), as shown in FIG. 12, so that the flange edge (15) can be not completely sealed and the inconvenient inflow of water is produced. Further, there is such a problem that a corrosion is produced in a flange tip end.

Therefore, in the example disclosed in the prior art of the Japanese Patent Application Publication No. 1998-1002, it is desired that the pressure receiving member (4) seals the flange edge (15) and the flange side portion (16), as the pressure receiving member (4) is transformed elastically and is elongated throughout and the gap is produced between the pressure receiving member (4) and the flange side portion (16), because a thickness of the pressure receiving member (4) is uniform, as shown in FIG. 11, when the extrusion molded product (1) is mounted on the flange edge (15) by contacting elastically thereof with a flange (14), as shown in FIG. 12.

SUMMARY OF THE INVENTION

It is an object of the present invention to provide an extrusion molded product having a core material which can completely seal a flange of automobile body in order to prevent an inflow of water and a production of noise in the running of automobile and to increase an air and water tightness.

An extrusion molded product having a core material according to the present invention comprises a core material having a generally U-shaped cross section and comprising a base portion and opposed side portions, a coating layer formed in the outside of said core material, a pressure receiving member of soft thermoplastic elastomer composition formed in the inside of said core material and connecting with the opposed side portion of the core material, a hollow chamber formed in the upper portion of said core material by connecting said pressure receiving member with the opposed side portions of the core material, and a sealing portion formed in a part of said pressure receiving member and having a thickness thinner than a thickness of said pressure receiving member.

In an embodiment of an extrusion molded product having a core material according to the present invention, the seal portion of thickness thinner than the thickness of pressure receiving member is formed in the center portion of the pressure receiving member.

In the another embodiment of an extrusion molded product having a core material according to the present invention, the seal portion of thickness thinner than the thickness of pressure receiving member is formed in any one of the left and right side of the pressure receiving member.

In an extrusion molded product having a core material according to the present invention, the pressure receiving member has an auxiliary layer formed integrally with the pressure receiving member and extending the both ends of the pressure receiving member along the side portions of the core material to the upper direction.

In an extrusion molded product having a core material according to the present invention, the core material has a coating layer formed in a part or the whole of the inside of said core material.

A soft thermoplastic elastomer composition for forming the pressure receiving member comprises:

100 parts by weight of component (a): a block copolymer comprising at least two polymer blocks A mainly consisting of a vinyl aromatic compound and at least one polymer block B mainly consisting of a conjugated diene compound, and/or a hydrogenated block copolymer obtained by hydrogenating the block copolymer (however, said polymer block B comprises a block copolymer which includes a polyisoprene block and which 20 to 80% by weight of the isoprene compound has a 1,4-bond and 80 to 20% by weight of the isoprene compound has a 3,4-bond, or a hydrogenated block copolymer which at least 80% by weight or more of aliphatic double bonds based on the isoprene compound are hydrogenated);

45 to 660 parts by weight of component (b): a block copolymer comprising at least two polymer blocks A mainly consisting of a vinyl aromatic compound and at least one polymer block B mainly consisting of a conjugated diene compound and/or a hydrogenated block copolymer obtained by hydrogenating the block copolymer (however, said polymer block B comprises a block copolymer which includes a polyisoprene block and which 70 to 100% by weight of the isoprene compound has a 1,4-bond, or a hydrogenated block copolymer which at least 90% or more of aliphatic double bonds based on the isoprene compound are hydrogenated);

10 to 35 parts by weight of component (c): a crystalline olefinic resin having a bending elastic modulus of 50 to 1000 MPa;

220 to 450 parts by weight of component (d): a non-aromatic rubber softener component; and 10 to 180 parts by weight of component (e): a hydrogenated petroleum resin.

A soft thermoplastic elastomer composition for forming the pressure receiving member is a tacky thermoplastic elastomer composition. Further, the soft thermoplastic elastomer composition of pressure receiving member has a type A durometer hardness of 1 to 20 (JIS K6253 a value after 15 seconds). The pressure receiving member has a reinforce portion comprising a thermoplastic elastomer composition having a type A durometer hardness of 20 to 80 (JIS K6253 a value after 15 seconds) formed in a part of the pressure receiving member.

DETAILED DESCRIPTION OF THE PREFERRED EMBODIMENTS

Figure 1:
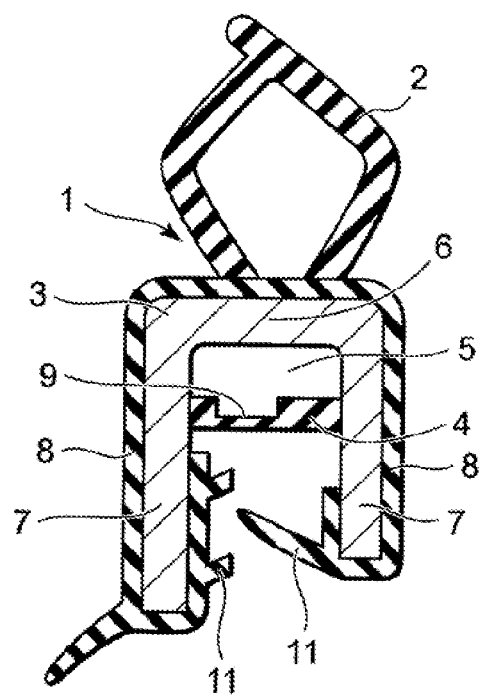
FIG. 1 is a vertically sectional view of an extrusion molded product having a core material according to the present invention.

The embodiments of the present invention will be described with reference to the drawings. FIG. 1 shows a cross section of an extrusion molded product having a core material, such as a weather strip and a trim, for mounting thereof on a flange around the periphery of an opening of an automobile body, such as a door, a trunk, a back door and a slide door. The extrusion molded product 1 comprises a core material 3 of a generally U-shaped cross section having a base portion 6 and opposed side portions 7,7 and a coating layer 8 formed in the outside of said core material 3. The core material 3 has a pressure receiving member 4 comprising a soft thermoplastic elastomer composition formed in the inside thereof, and the pressure receiving member 4 is connected with the opposed side portions 7, 7 of the core material 3. A hollow chamber 5 is formed in the upper portion of the core material 3 by connecting the pressure receiving member 4 with the opposed side portions 7, 7 of the core material 3. The pressure receiving member 4 has a sealing portion 9 of a thickness thinner than a thickness of the pressure receiving member 4 formed in the center portion of the pressure receiving member 4. Preferably, the thickness of the sealing portion 9 is a half and less of the thickness of the pressure receiving member 4.

Figure 6:
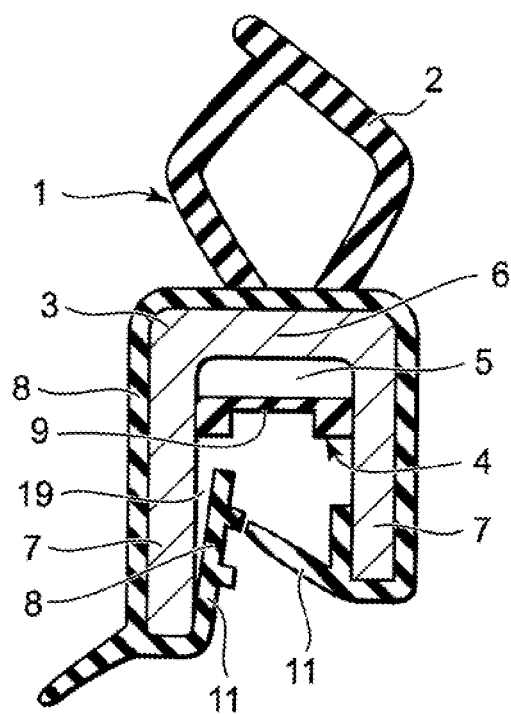
FIG. 6 is a vertically sectional view of another embodiment of the extrusion molded product according to the present invention.

As shown in FIG. 6, the sealing portion 9 of thickness thinner than the thickness of the pressure receiving member 4 can be formed in the under-side of the center portion of the pressure receiving member 4.

The coating layer 8 is formed also in the inside of the core material 3 and the coating layer 8 has opposed holding pieces 11 formed inside the side portions 7 of the core material 3, for mounting the extrusion molded product 1 on a flange 14 of an automobile body. The opposed holding pieces 11 can be formed at symmetric or unsymmetric quantity and at various dimension in the coating layer 8 around the opposed side portions 7 of the core material 3 according to the necessity.

Further, the coating layer 8 has a hollow seal portion 2 formed at the desired position outside the base portion 6 or the side portions 7 of the core material 3. The hollow seal portion 2 can be formed in various type of shapes, such as a polygonal shape, a circular shape, and an elliptical shape, as required.

Figure 2:
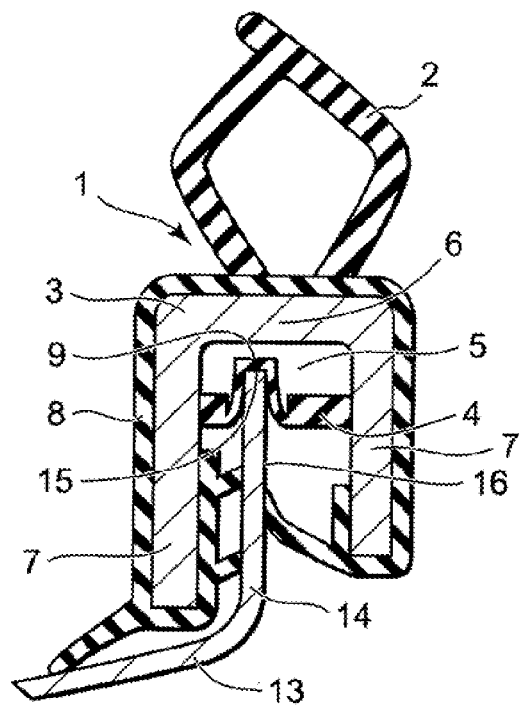
FIG. 2 is a vertically sectional view showing such a state that the extrusion molded product of the present invention is mounted on a flange around the periphery of an opening of an automobile body.

FIG. 2 shows a state in which the extrusion molded product 1 shown in FIG. 1 is mounted on the flange 14 of a body panel 13 around the periphery of an opening of an automobile body, and the sealing portion 9 is enlarged enough and squeezes a flange edge 15 and flange side portion 16.

Figure 3:
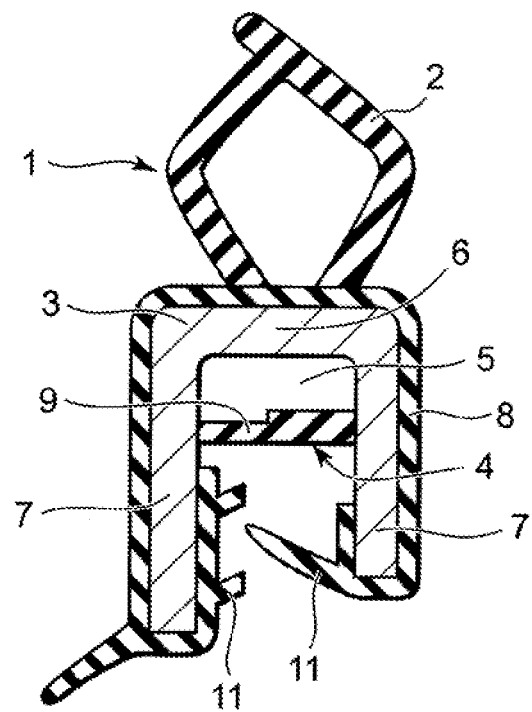
FIG. 3 is a vertically sectional view of the extrusion molded product of the present invention wherein a pressure receiving member has a sealing portion of a thinner thickness formed on the left side thereof.

In the extrusion molded product 1 shown in FIG. 3, the sealing portion 9 of thickness thinner than the thickness of the pressure receiving member 4 is formed in the left side of the pressure receiving member 4.

Figure 4:
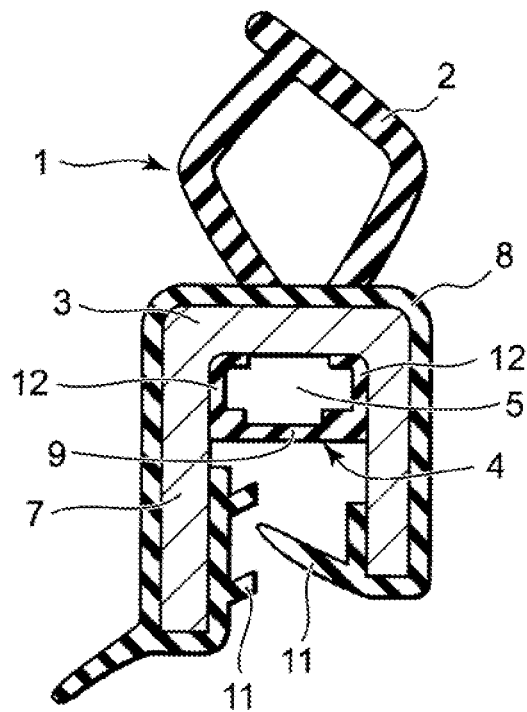
FIG. 4 is a vertically sectional view of the extrusion molded product of the present invention wherein the pressure receiving member has an auxiliary layer extending the both ends along side portions of a core material to the upper direction.

In the extrusion molded product 1 shown in FIG. 4, an auxiliary layer 12 is formed integrally with the pressure receiving member 4 and is extended along the side portions 7 of the core material 3 to the upper direction. The auxiliary layer 12 can be formed in part or all of a periphery of the hollow chamber 5.

Figure 5:
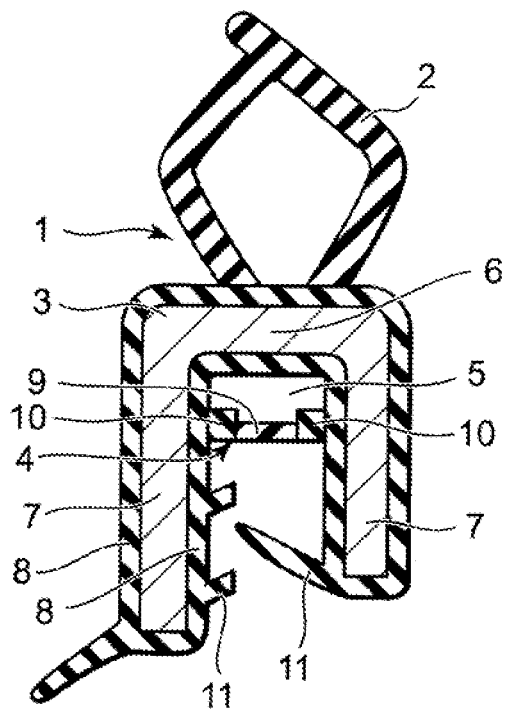
FIG. 5 is a vertically sectional view of the extrusion molded product of the present invention wherein a coating layer is formed in the whole of the inside of the core material.

In the extrusion molded product 1 shown in FIG. 5, the coating layer 8 is formed in all of the inner side of the core material 3, and the coating layer 8 can be formed only in part of the inner side of the core material 3, as shown in FIG. 1 to FIG. 4. Further, a reinforce portion 10 is formed in the pressure receiving member 4. As shown in FIG. 6, it is possible for the coating layer 8 to form a non heat-welded portion 19 which is not heat-welded to the side portions 7 of the core material 3.

Figure 7:
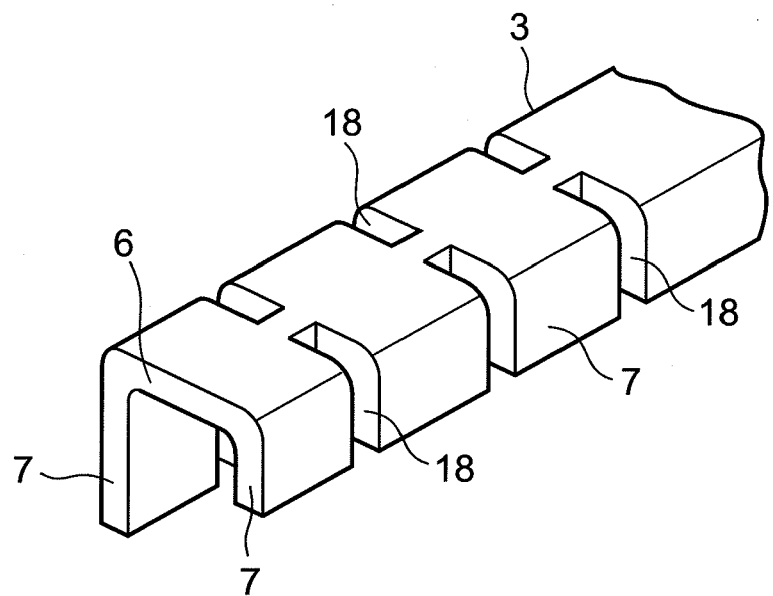
FIG. 7 is a perspective view of the core material of the present invention wherein cut-out portions are formed oppositely in a base portion and side portions of the core material.
Figure 8:
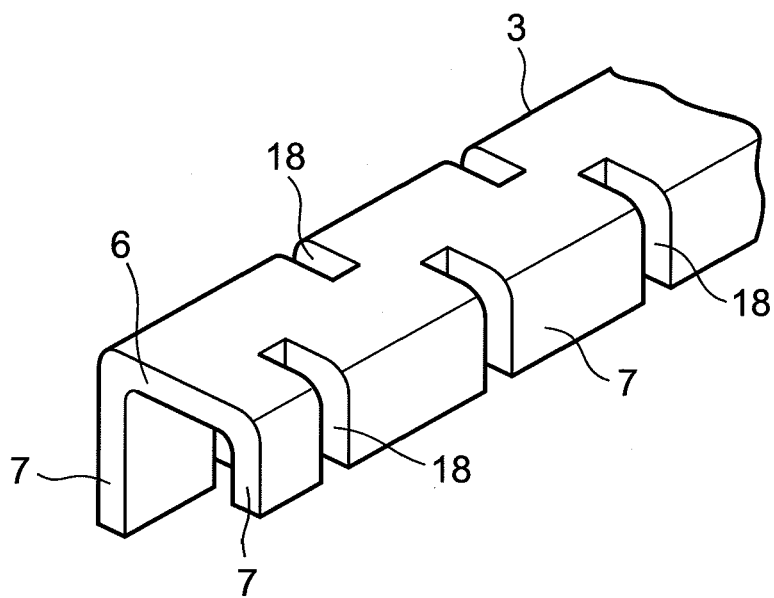
FIG. 8 is a perspective view of the core material of the present invention wherein the cut-out portions are formed alternately in the base portion and side portions of the core material.

FIG. 7 and FIG. 8 show embodiments of the core material 3 of the extrusion molded product 1 according to the present invention. In the embodiment shown in FIG. 7, cut-out portions 18 are formed in the opposed position on the left and right side portions 7 and base portion 6 of the core material 3. In the embodiment shown in FIG. 8, the cut-out portions 18 are formed in the alternated position on the base portion 6 and side portions 7 of the core material 3.

Figure 9:
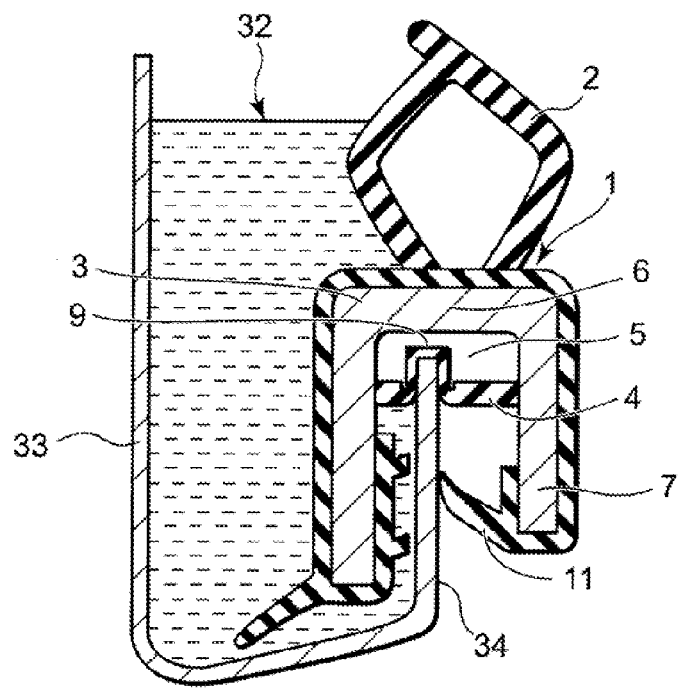
FIG. 9 is a vertically sectional view showing such a state that a water leaking test is made to the extrusion molded product having a core material of the present invention.

FIG. 9 shows a schematic view of a test method, of which a water leak test is conducted to the extrusion molded product 1 of the present invention in such state that the extrusion molded product 1 is mounted on a metal test tank 33 so as to press the pressure receiving member 4, and a water 32 is supplied to the test tank 33 and is filled to the half way of the height of the hollow seal portion 2 of the coating layer 8. In FIG. 9, a reference numeral 34 denotes an outer portion of the test tank 33.

Figure 10:
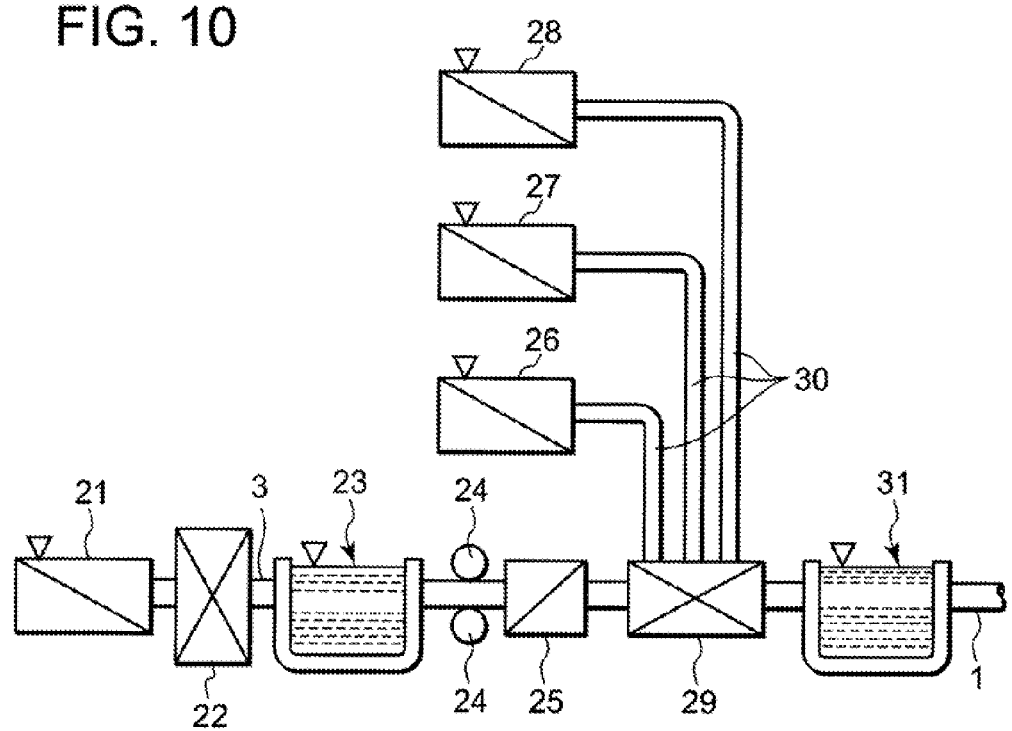
FIG. 10 is a side view showing a manufacturing process of the extrusion molded product of the present invention.

FIG. 10 shows an embodiment of a manufacturing method in which an extrusion molding of the core material 3 comprising a hard synthetic resin and an extrusion molding of the coating layer 8 and pressure receiving member 4 comprising respectively a thermoplastic elastomer are continuously carried out. The hard synthetic resin is injected into a first extrusion molding machine 21, and the core material 3 having a generally U-shaped cross section is formed through a first mold die 22. Subsequently, the core material 3 pass through a first cooling tank 23 and then a take-up roller 24, and the cut-out portions 18 are cut out, in the desired various shapes, as shown in FIG. 7 and FIG. 8, on the base portion 6 and side portions 7 of the core material 3 having a generally U-shaped cross section by a cutting machine 25.

Then, the core material 3 enters inside a second mold die 29, and a melted thermoplastic elastomer for forming the coating layer 8 injected into a second extrusion molding machine 26, a melted thermoplastic elastomer for forming the hollow seal portion 2 injected into a third extrusion molding machine 27, and a melted thermoplastic elastomer for forming the pressure receiving member 4 injected into a four extrusion molding machine 28 are inserted inside the second mold die 29 through injection tubes 30 and are formed integrally with the core material 3 inside the second mold die 29 by heat-welding thereof to the periphery of the core material 3. Subsequently, the core material 3 having the coating layer 8, the hollow seal portion 2 and the pressure receiving member 4 pass through a second cooling tank 31 and consequently the extrusion molded product 1 is produced.

Figure 11:
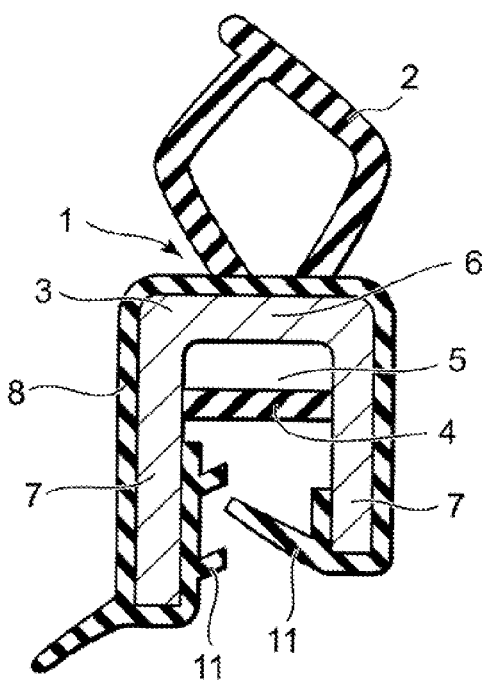
FIG. 11 is a vertically sectional view of an extrusion molded product of the prior art.
Figure 12:
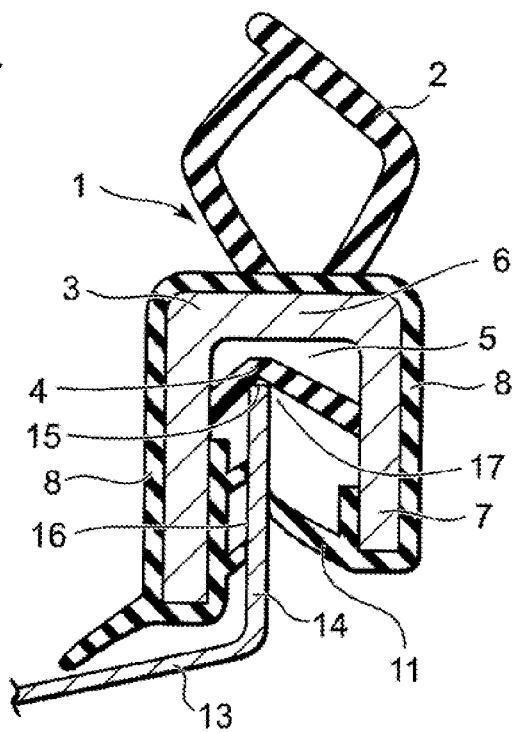
FIG. 12 is a vertically sectional view showing such a state that the extrusion molded product of the prior art is mounted on a flange around the periphery of an opening of an automobile body.

FIG. 11 shows an extrusion molded product 1 of the prior art in which a thickness of pressure receiving member 4 is uniform, and FIG. 12 shows such a state that the extrusion molded product 1 shown in FIG. 11 is mounted on a flange 14 and a gap 17 is produced between a pressure receiving member 4 and flange side portions 16, because the thickness of the pressure receiving member 4 is uniform.

The components of a soft thermoplastic elastomer composition forming a pressure receiving member 4 comprises 100 parts by weight of component (a): a block copolymer comprising a least two polymer block A mainly consisting of a vinyl aromatic compound and at least one polymer block B mainly consisting of a conjugated diene compound, and/or a hydrogenated block copolymer obtained by hydrogenating the block copolymer (however, said polymer block B comprises a block copolymer which includes a polyisoprene block and which 20 to 80% by weight of the isoprene compound has a 1,4-bond and 80 to 20% by weight of the isoprene compound has a 3,4-bond, or a hydrogenated block copolymer which at least 80% or more of aliphatic double bonds based on the isoprene compound are hydrogenated); 45 to 660 parts by weight of component (b): a block copolymer comprising at least two polymer blocks A mainly consisting of a vinyl aromatic compound and at least one polymer block B mainly consisting of a conjugated diene compound and/or a hydrogenated block copolymer obtained by hydrogenating the block copolymer (however, said polymer block B comprises a block copolymer which includes a polyisoprene block and which 70 to 100% by weight of the isoprene compound has a 1,4-bond, or a hydrogenated block copolymer which at least 90% or more of aliphatic double bonds based on the isoprene compound are hydrogenated); 10 to 35 part by weight of component (c): a crystalline olefinic resin having a bending elastic modulus of 50 to 1000 MPa; 220 to 450 parts by weight of component (d): a non-aromatic rubber softener component; and 10 to 180 parts by weight of component (e): a hydrogenated petroleum resin.

The pressure receiving member 4 comprises a tacky thermoplastic elastomer.

Further, the pressure receiving member 4 comprises a soft thermoplastic elastomer composition having a type A durometer hardness (JIS K6253 a value after 15 seconds) of 1 to 20.

A reinforce portion 10 comprising a thermoplastic elastomer having a type A durometer hardness (JIS K6253 a value after 15 seconds) of 20 to 80 is formed at least in a part of the pressure receiving member 4 excluding the sealing portion 9 to elonge effectively said sealing portion 9 of thickness thinner than the thickness of the pressure receiving member 4.

As examples of the materials forming the extrusion molded product, the core material 3 having a generally U-shaped cross section comprises a hard synthetic resin or a metal. The hard synthetic resin of the core material 3 consists of an olefinic resin or a mixed synthetic resin obtained by mixing an olefinic resin with 20 to 50% by weight of powder of talc, etc., having a type A durometer hardness (JIS K6253 a value after 15 seconds) of 85 or more.

The coating layer 8 comprises an olefinic thermoplastic elastomer or foam thereof, or a styrenic thermoplastic elastomer or foam thereof, having a type A durometer hardness (JIS K6253 a value after 15 seconds) of 40 to 85, and the hollow seal portion 2 comprises an olefinic thermoplastic elastomer or foam thereof having a type A durometer hardness (JIS K6253 a value after 15 seconds) of 20 to 60.

EXAMPLES

Examples and comparative examples of the thermoplastic elastomer composition forming the pressure receiving member 4 are described therein-after, but the present invention is not limited to these. The materials and test methods used in the examples and comparative examples are as follows.

Materials

Component (a):
    Hydrogenated SIS: HYBRAR 7125 (manufactured by KURARAY CO., LTD.)
        styrene content: 20% by weight, isoprene content: 80%
        0% hydrogenation Component (b):
    SEEPS: SEPTON 4077 (manufactured by KRARAY CO., LTD.)
        styrene content: 30% by weight, isoprene content: 70%
        90% or more by hydrogenation
        number average molecular weight of 260,000
        weight average molecular weight of 320,000

Component (c):
    PP: Example FX4E (manufactured by Japan Polyproprene Corporation)
        polyproprene, MFR 5.3 g/10 min,
        bending elastic modulus: 650 MPa
        Comparative example EA9 (manufactured by Japan Polyproprene Corporation)
        polyproprene, MFR 0.5 g/10 min,
        bending elastic modulus: 1800 MPa Component (d):
    Paraffin oil: PW-90 (trade name, manufactured by Idemitsu Kosan Co., Ltd.)
        n-paraffinic oil, weight average molecular weight of 540, dynamic viscosity of 95.54 cSt at 40° C., dynamic viscosity of 11.25 cSt at 100° C., pour point of −15° C., flash point (COC) of 270° C.

Component (e):
    hydrogenated petroleum resin: I-MARV P140 (manufactured by Idemitsu Kosan Co., Ltd.)
    C5-aromatic copolymer hydrogenation resin In the above examples, the components were melted and kneaded in the lump. The melting and kneading condition was as follows: a two shafts type extruder, a kneading temperature of 160° C. to 240° C., and a screw revolution number of 100 rpm. The following tests were performed to the obtained resin composition and the result is shown in Table 1.

Comparative Example 10

TPS: styrenic resin
LEOSTMER LJ-1040N manufactured by RIKEN TECHNOS CORP.

Comparative Example 11

TPO: olefinic resin
MULTIUSE LEOSTOMER LE-3140N manufactured by RIKEN TECHNOS CORP.

Test Methods (1) Hardness: In conformity with JIS K6253 (a value after 15 seconds), a press sheet of 6 mm thickness is used as a test piece to measure the type A durometer hardness.

(2) Compression set (%): In conformity with JIS K6262, a circular test piece of 13 mm diameter and 6.3 mm thickness obtained by press molding is used, and the test conditions are made as a compressibility 25% and 70° C.×24 hours.

(3) Adhesion (N/100 mm width): A press sheet of 1 mm thickness is set on a coating plate (3 mm thickness×100 mm length), and a load 500 g is added to the press sheet. It is measured by a tensile tester (tensile speed 10 mm/minute) after 23° C.×24 hours.

(4) Water leak test: The extrusion molded product 1 of the present invention is mounted on the test tank 33 and the test tank 33 is filled with the water, as shown in FIG. 9. After 23° C.×48 hours, it is measured whether the water is leaked from the outer portion 34 of the test tank 33. However, there is a problem to an extrusion moldability in Comparative examples 1, 2, 4, 5, and 7, and the water leak test is impossible, because the extrusion molded product for use of the water leak test is not obtainable.

○: non leakage
X: leakage
Wrong: an extrusion mold is wrong.

(5) Extrusion moldability: An extrusion moldability is confirmed and judged in an extrusion mold as shown in FIG. 10.

◎: very good
○: goods
X: bad

Examples 1 to 9 and Comparative examples 1 to 11

The components shown in Table 1 to Table 7 were melted and kneaded in the lump. The melting and kneading conditions were as follows: the use of a two shafts type extruder, a kneading temperature of 160° C. to 240° C., and a screw revolution of 100 rmp. The above-mentioned tests of (1) Hardness, (2) Compression set, and (3) Adhesion were performed to the obtained resin composition and the results are shown in Table 1 to Table 7. Subsequently, an extrusion molded product as shown in FIG. 1 was molded by extrusion molding said resin composition as shown in FIG. 10, a test of (4) Water leak test and a confirmation of (5) Extrusion moldability were performed, and the evaluated result are shown in Table 1 to Table 7.

TABLE 1

| Component composition | Example 1 | Example 2 | Example 3 | Example 4 |
|---|---|---|---|---|
| Component (a) Hydrogenated SIS | 100 | 100 | 100 | 100 |
| Component (b) SEEPS | 100 | 640 | 65 | 100 |
| Component (c) PP FX4E | 20 | 20 | 20 | 33 |
| Component (c) PP EA9 | | | | |
| Component (d) OIL | 330 | 330 | 330 | 330 |
| Component (e) Petroleum resin Styrenic resin Olefinic resin | 60 | 60 | 60 | 60 |
| Evaluated result | | | | |
| Hardness (a value after 15 seconds) | 9 | 19 | 6 | 19 |
| Compression set (%) | 84 | 55 | 100 | 90 |
| Adhesion (N/100 mm width) | 10 | 6 | 50 | 6 |
| Water leak test | ○ | ○ | ○ | ○ |
| Extrusion moldability | ◎ | ○ | ○ | ◎ |

TABLE 2

| Component composition | Example 5 | Example 6 | Example 7 | Example 8 |
|---|---|---|---|---|
| Component (a) Hydrogenated SIS | 100 | 100 | 100 | 100 |
| Component (b) SEEPS | 200 | 100 | 100 | 100 |
| Component (c) PP FX4E | 12 | 20 | 20 | 20 |
| Component (c) PP EA9 | | | | |
| Component (d) OIL | 330 | 430 | 230 | 330 |
| Component (e) Petroleum resin Styrenic resin Olefinic resin | 60 | 60 | 60 | 160 |
| Evaluated result | | | | |
| Hardness (a value after 15 seconds) | 5 | 4 | 18 | 18 |
| Compression set (%) | 77 | 78 | 89 | 100 |
| Adhesion (N/100 mm Width) | 15 | 13 | 6 | 45 |
| Water leak test | ○ | ○ | ○ | ○ |
| Extrusion moldability | ○ | ◎ | ◎ | ○ |

TABLE 3

| Component composition | Example 9 |
|---|---|
| Component (a) Hydrogenated SIS | 100 |
| Component (b) SEEPS | 100 |
| Component (c) PP FX4E | 20 |
| Component (c) PP EA9 | |
| Component (d) OIL | 330 |

TABLE 3-continued

| Component composition | Example 9 |
|---|---|
| Component (e) Petroleum resin | 13 |
| Styrenic resin | |
| Olefinic resin | |
| Evaluated result | |
| Hardness (a value after 15 seconds) | 7 |
| Compression set (%) | 79 |
| Adhesion (N/100 mm width) | 6 |
| Water leak test | ○ |
| Extrusion moldability | ○ |

TABLE 4

| Component composition | Comparative example 1 | Comparative example 2 | Comparative example 3 |
|---|---|---|---|
| Component (a) Hydrogenated SIS | 100 | 100 | 100 |
| Component (b) SEEPS | 700 | 35 | 100 |
| Component (c) PP FX4E | 20 | 20 | 37 |
| Component (c) PP EA9 | | | |
| Component (d) OIL | 330 | 330 | 330 |
| Component (e) Petroleum resin | 60 | 60 | 60 |
| Styrenic resin | | | |
| Olefinic resin | | | |
| Evaluated result | | | |
| Hardness (a value after 15 seconds) | 22 | 5 | 21 |
| Compression set (%) | 53 | 96 | 94 |
| Adhesion (N/100 mm width) | 3 | 54 | 3 |
| Water leak test | Wrong | Wrong | X |
| Extrusion moldability | X | X | ○ |

TABLE 5

| Component composition | Comparative example 4 | Comparative example 5 | Comparative example 6 |
|---|---|---|---|
| Component (a) Hydrogenated SIS | 100 | 100 | 100 |
| Component (b) SEEPS | 200 | 100 | 100 |
| Component (c) PP FX4E | 8 | 20 | 20 |
| Component (c) PP EA9 | | | |
| Component (d) OIL | 330 | 460 | 200 |
| Component (e) Petroleum resin | 60 | 60 | 60 |
| Styrenic resin | | | |
| Olefinic resin | | | |
| Evaluated result | | | |
| Hardness (a value after 15 seconds) | 3 | 3 | 21 |
| Compression set (%) | 77 | 78 | 91 |
| Adhesion (N/100 mm width) | 18 | 14 | 3 |
| Water leak test | wrong | wrong | X |
| Extrusion moldability | X | X | ⊚ |

TABLE 6

| Component Composition | Comparative example 7 | Comparative example 8 | Comparative example 9 |
|---|---|---|---|
| Component (a) Hydrogenated SIS | 100 | 100 | 100 |
| Component (b) SEEPS | 100 | 100 | 100 |
| Component (c) PP FX4E | 20 | 20 | |
| Component (c) PP EA9 | | | 20 |
| Component (d) OIL | 330 | 330 | 330 |
| Component (e) Petroleum resin | 200 | 8 | 13 |
| Styrenic resin | | | |
| Olefinc resin | | | |
| Evaluated result | | | |
| Hardness (a value after 15 seconds) | 21 | 6 | 16 |
| Compression set (%) | 100 | 78 | 74 |
| Adhesion (N/100 mm width) | 49 | 3 | 3 |
| Water leak test | wrong | X | X |
| Extrusion moldability | X | ⊚ | ⊚ |

TABLE 7

| Component composition | Comparative example 10 | Comparative example 11 |
|---|---|---|
| Component (a) Hydrogenated SIS | | |
| Component (b) SEEPS | | |
| Component (c) PP FX4E | | |
| Component (c) PP EA9 | | |
| Component (d) OIL | | |
| Component (e) Petroleum resin | | |
| Styrenic resin | 100 | |
| Olefinic resin | | 100 |
| Evaluated result | | |
| Hardness (a value After 15 seconds) | 40 | 40 |
| Compression set (%) | 42 | 44 |
| Adhesion (N/100 mm width) | <1 | <1 |
| Water leak test | X | X |
| Extrusion moldability | ⊚ | ⊚ |

As appears from Table 1 to Table 3, the examples 1 to 9 are a thermoplastic elastomer composition forming the pressure receiving member 4 of the present invention.

In the other hand, the comparative examples 1 to 9 of Table 4 to Table 6 are a thermoplastic elastomer composition which is beyond the limits of the components of the pressure receiving member 4 according to the present invention. In the comparative examples 3, 6, 8, and 9, there is a problem to the water leak test. Further, the comparative examples 1, 2, 4, 5, and 7 have a problem to the extrusion moldability, the water leak test is wrong, because an extrusion molded product for the use of the water leak test is not obtainable.

The comparative examples 10 and 11 of Table 7 comprise an extrusion molded product of the prior art which has a type A durometer hardness (JIS K6253 a value after 15 seconds) of 20 or more. The extrusion molded product of the prior art has not an adhesion, and has also a problem to the water leak test.

As the extrusion molded product 1 of the present invention has the hollow chamber 5 formed by connecting the pressure receiving member 4 to the opposed side portions 7 of the core material 3 and has the seal portion 9 of thickness thinner than the thickness of the pressure receiving member 4 formed in the center portion of the pressure receiving member 4, the sealing portion 9 of thickness thinner than the thickness of the pressure receiving member 4 is largely elongated elastically, and said sealing portion 9 squeezes the flange edge 15 and flange side portions 16 and can seal the part of the flange side portion 16, when the extrusion molded product 1 is mounted on the flange edge 15. Therefore, the space between the pressure receiving member 4 and the flange edge 15 is completely sealed and it is possible for the sealing portion 9 to prevent the inflow of water and the production of corrosion in the flange tip edge.

In the extrusion molded product 1 of the present invention, the pressure receiving member 4 comprises a soft thermoplastic elastomer, composition preferably, a tacky thermoplastic elastomer composition. Therefore, the inflow of water and the production of noise in the running of automobile can be prevented to increase the air and water tightness.

Further, the pressure receiving member 4 comprises a soft thermoplastic elastomer composition having a type A durometer hardness (JIS K6253 a value after 15 seconds) of 1 to 20, so that the sealing portion 9 has the excellent elasticity and can be easily elongated.

What is claimed is:

1. An extrusion molded product comprising:
    a core material configured to mount said extrusion molded product on a flange around the periphery of an opening of an automobile body, said core material having a generally U-shaped cross section in a longitudinal direction and having a base portion and opposed side portions;
    a coating layer disposed on an outside surface of said core material;
    a pressure receiving member comprising a soft thermoplastic elastomer composition and being disposed on a inside of said core material so as to connect with said opposed side portions of said core material, said soft thermoplastic elastomer composition being formed of a tacky thermoplastic elastomer composition and having a type A durometer hardness of 1 to 20;
    a hollow chamber formed in an upper portion of said core material by said pressure receiving member being connected to said side portions of said core material; and
    a sealing portion disposed in a part of said pressure receiving member and having a thickness of a half or less of the thickness of said pressure receiving member so as to seal a flange edge and flange side portions by bending said sealing portion when said extrusion molded product is mounted to the flange.

2. The extrusion molded product according to claim 1, wherein said sealing portion is disposed in a center portion of said pressure receiving member.

3. The extrusion molded product according to claim 1, where said sealing portion is on at least one of a left side and a right side of said pressure receiving member.

4. The extrusion molded product according to claim 1, wherein said pressure receiving member has an auxiliary layer formed integrally with said pressure receiving member and said auxiliary layer extends from both ends of said pressure receiving member and along said side portions of said core material in an upper direction.

5. The extrusion molded product according to claim 1, wherein said core material has a coating layer disposed in a part or all of the inside of said core material.

6. The extrusion molded product according to claim 1, wherein said soft thermoplastic elastomer composition of said pressure receiving member comprises:
    100 parts by weight of a first component including a block copolymer comprising at least two polymer blocks including a vinyl aromatic compound and at least one polymer block including at least one of a conjugated diene compound and a hydrogenated block copolymer obtained by hydrogenating the block copolymer, said at least one polymer block of said first component further including a block copolymer which includes a polyisoprene block and which 20 to 80% by weight of the isoprene compound has a 1,4-bond and 80 to 20% by weight of the isoprene compound has a 3,4-bond, or a hydrogenated block copolymer which at least 80% or more of aliphatic double bonds based on the isoprene compound are hydrogenated;
    45 to 660 parts by weight of a compound including a block copolymer comprising at least two polymer blocks including a vinyl aromatic compound and at least one polymer block including at least one of a conjugated diene compound and a hydrogenated block copolymer obtained by hydrogenating the block copolymer, said at least one polymer block of said compound further including a block copolymer which includes at least one of a polyisoprene block and which 70 to 100% by weight of the isoprene compound has a 1, 4-bond and a hydrogenated block copolymer which at least 90% or more of aliphatic double bonds based on the isoprene compound are hydrogenated;
    10 to 35 parts by weight of a second component including a crystalline olefinic resin having a bending elastic modulus of 50 to 1000 MPa;
    220 to 450 parts by weight of a third component including a non-aromatic rubber softener component; and
    10 to 180 parts by weight of a fourth component including a hydrogenated petroleum resin.

7. The extrusion molded product according to claim 1, wherein said pressure receiving member has a reinforce portion comprising a thermoplastic elastomer having a type A durometer of 20 to 80 formed at least in a part of said pressure receiving member excluding said sealing portion.

8. The extrusion molded product according to claim 1, wherein said core material comprises a hard synthetic resin or a metal.

* * * * *